(12) United States Patent
Alexander et al.

(10) Patent No.: US 8,516,175 B2
(45) Date of Patent: Aug. 20, 2013

(54) GRAPHICAL DEVELOPMENT TOOL FOR COMPENSATION ACTIONS AND COMPENSATION SCOPE IN A PROCESS FLOW ENVIRONMENT

(75) Inventors: William Alexander, Providence, RI (US); Shyh-Mei F. Ho, San Jose, CA (US); Jenny C. Hung, San Jose, CA (US); Cynthia F. Krauss, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 12/649,838

(22) Filed: Dec. 30, 2009

(65) Prior Publication Data
US 2011/0161920 A1 Jun. 30, 2011

(51) Int. Cl.
*G06F 13/42* (2006.01)
*G06F 11/00* (2006.01)

(52) U.S. Cl.
USPC .......................................... 710/105; 714/4.1

(58) Field of Classification Search
None
See application file for complete search history.

(56) References Cited

U.S. PATENT DOCUMENTS

| | | | |
|---|---|---|---|
| 6,266,782 B1 * | 7/2001 | Carter et al. | 714/4.3 |
| 2002/0019956 A1 * | 2/2002 | Carter et al. | 714/4 |

\* cited by examiner

*Primary Examiner* — Hyun Nam
(74) *Attorney, Agent, or Firm* — Patents on Demand P.A.; Brian K. Buchheit; Scott M. Garrett

(57) ABSTRACT

A graphical user interface (GUI) of a software development tool can visually compose process flows for enterprise information system (EIS) process flow applications. The GUI can include a canvas that visually shows a set of process flows of a process flow application as a set of interconnected node objects. Each node object can corresponds to a node, which corresponds to at least one process flow. The GUI can also include a graphical compensation tool through which users define and view compensation actions and compensation scopes of process flows of the process flow application, wherein said graphical compensation tool does not require a user to input code text that defining compensation logic of the process flows.

20 Claims, 5 Drawing Sheets

| RETURN CODE (HEX) | REASON CODE (HEX) | DESCRIPTION 350 |
|---|---|---|
| 0100 | 000C | Partial output response is returned |
| | 0100 | Error message is returned in the output response data |
| | 0104 | Request is timed out |
| | 0105 | Request message is rejected by the external application |
| | 010C | The synchronous call was cleared by a command (such as a /STOP or /PSTOP command) |
| 0104 | 0210 | Input area length (AIBOALEN) is set to zero |
| | 0214 | Output area length (AIBOAUSE) is set to zero |
| | 0218 | Sub-function code is not known or invalid |
| | 0610 | Request input area address parameter is missing |
| | 0614 | Response output area address parameter is missing |
| | 1020 | Descriptor name is invalid |
| | 1024 | Timeout value is invalid |
| 0108 | 0010 | Unable to obtain private storage. The size of the input request data might be too large. |
| | 0580 | Unable to send the request message to the external application |
| | 0584 | Unable to process the response output message from the external application |

FIG. 3B

| RESP code | RESP2 code | Name | Description |
|---|---|---|---|
| 16 | 8-50 | INVREQ | Invalid request to LINK to another program, check options used on the command |
| 22 | 11-27 | LENGERR | The value specified for the LENGTH option is invalid |
| 27 | 1-25 | PGMIDERR | The value specified for the PROGRAM option is invalid |
| 53 | 18-32 | SYSIDERR | The value specified for the SYSID option is incorrect |
| 70 | 101 | NOTAUTH | A resource security check has failed on PROGRAM (name) |
| 81 | 17 | TERMERR | An irrevocable error occurs during the conversation (for example, if the session fails, or if the server region fails) |
| 82 | 29 | ROLLEDBACK | The SYNCONRETURN is specified and the search program is unable successfully to take a syncpowered server program has taken a rollback and all changes...to recoverable resources in the remote region, |
| 121 | 0 | RESUNAVAIL | A resource required by the linked-to program is unavailable in the region. The RESUNAVAIL condition applies to dynamically distributed program link (DPL) requests. |
| 122 | 1 | CHANELERR | The name specified on the CHANNEL option contains an unknown character or combination of characters |

FIG. 3C

GRAPHICAL DEVELOPMENT TOOL FOR COMPENSATION ACTIONS AND COMPENSATION SCOPE IN A PROCESS FLOW ENVIRONMENT

BACKGROUND

The disclosure relates to the field of process flow applications and, more particularly, to a graphical software developer's tool that adds compensation functionality including an ability to specify compensation actions and compensation scope to process flow applications.

A process flow application is a composite business program choreographing data exchanges between service blocks, representing the various software applications that participate in an electronic business process. These various software applications represented by the service blocks often operate on different platforms and/or from different network locations (i.e., external to the business network). Process flow applications provide a high-level approach for managing business process across multiple, disparate software systems.

A current approach to handling compensation (e.g., to compensate for unexpected results or error conditions) within process flow applications is to manually add logic using text-based code entered via a text editor. This logic would detail necessary steps for performing compensation checking and related actions, when process flows execute. Additionally, manual code for handling error scenarios related to compensation logic has historically been needed. For example, compensation logic typically is manually entered to an information management system (IMS) synchronous callout application, which goes outbound to an external server to handle an error scenario. Manually entering compensation logic can be a time consuming and costly endeavor. For example, it is not uncommon for customers to need to change hundreds or even thousands of IMS applications to perform function calls with compensation checking and actions.

BRIEF SUMMARY

The disclosure provides a graphical tool for process flow compensation that eases the job of creating Enterprise Information Systems (EIS) applications (e.g., information management system (IMS), Customer Information Control System (CICS), etc.). The graphical tool permits compensation scope and logic to be modeled via a graphical user interface (GUI). The modeled scope and logic can be used to automatically generate compensation code, thereby reducing manual programming efforts for code exceptions and compensation handling.

One aspect of the invention is for a graphical user interface (GUI) of a software development tool operable to visually compose process flows for enterprise information system (EIS) process flow applications. The GUI can include a canvas that visually shows a set of process flows of a process flow application as a set of interconnected node objects. Each node object can corresponds to a node, which corresponds to at least one process flow. The GUI can also include a graphical compensation tool through which users define and view compensation actions and compensation scopes of process flows of the process flow application, wherein said graphical compensation tool does not require a user to input code text that define compensation logic of the process flows.

In one aspect of the invention, node objects can be displayed within a canvas of a graphical user interface. Each node object can correspond to a node, which is a reusable component of a process flow application. Each node can be a functional component with internal functionality not externally exposed except through defined input and output parameters. Each node can interact with one another nodes in a manner expressed within the graphical user interface by linkages between the corresponding node objects. An interactive graphical compensation tool can be presented that is operable to define compensation actions for the nodes. The compensation actions can be actions to be taken responsive to an error condition to preserve a transaction processing state of the corresponding node. A set of at least one user selections of graphical interface elements can be received. These user selections can be associated with the graphical compensation tool. User selections can define compensation functionality to be established for a node, which is graphically selected by selecting a corresponding node object in the canvas. Compensation logic can be created for the node in accordance with the user selections. The creating of the compensation logic requires no manual code-level input from a user. That is, low-level code for the compensation logic can be machine generated based on the graphically entered user input.

BRIEF DESCRIPTION OF THE SEVERAL VIEWS OF THE DRAWINGS

FIGS. 3A, 3B, and 3C show a sample error case using IMS synchronous callout and CICS LINK error conditions that can be evaluated to determine whether compensation actions should be executed in accordance with an embodiment of the disclosure.

DETAILED DESCRIPTION

Figure 1:
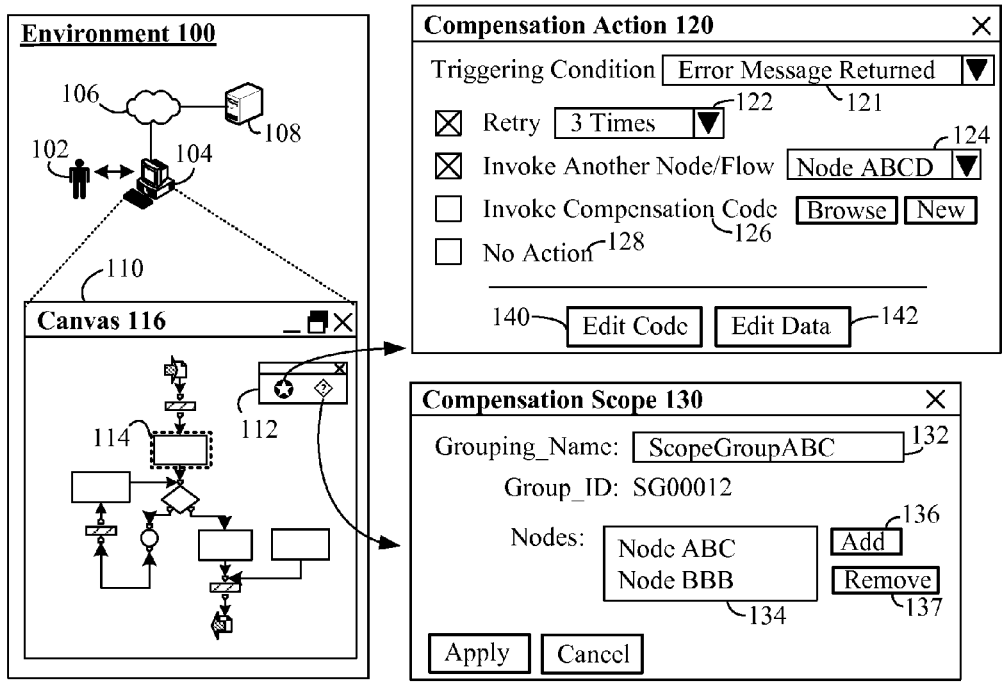
FIG. 1 shows a software development environment having graphical user interface that includes a compensation tool, which is a graphical tool for viewing, creating, and editing compensation functionality to business flows and/or applications comprising business flows.
Figure 1:
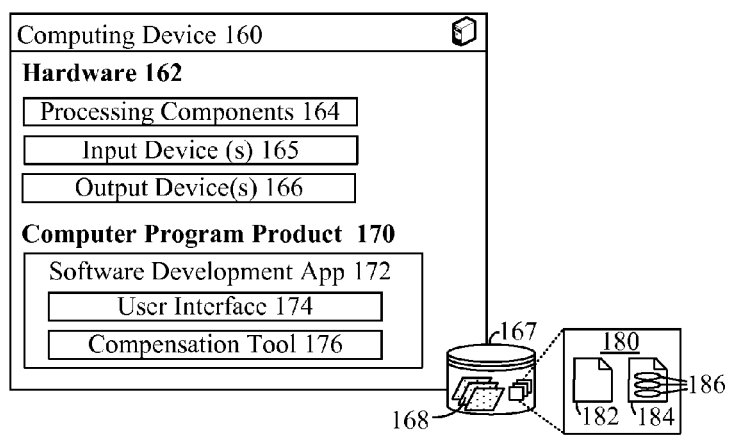

Process flow applications are transaction programs consisting of a set of flows, which interact with one another in a defined manner. Each flow can be an autonomous unit, which from a flow perspective is treated similar to a "black box" that receives input and produces output, where internal processes of the flows are not exposed (e.g., are private). Flows and process flow applications can execute across multiple different computing devices and platforms of a distributed computing environment, such as a service oriented architecture (SOA). Flow handling components are defined within this distributed environment, which can interoperate so long as they conform to a set of defined standards, which the process flow applications are written in compliance of.

Appreciatively, a transaction program manages data (in this case flows) that must be left in a consistent state. For example, if an electronic payment is made, the amount must be either both withdrawn from one account and added to the other or none at all. In case of a failure preventing transaction completion, the partially executed transaction must be undone or rolled back by a transaction processing system. Thus, a partially completed flow action that doesn't complete as it should, may be reverted to a state that it was in before the partially completed flow action was initiated (other actions may be taken other than to revert the state of the flow, but it is unacceptable to leave the flow in the partially completed state, which is an uncertain one). In other words, compensation actions related to preserving a proper state of a flow must be taken whenever an unexpected situation arises.

These compensation actions can be challenging to implement within a distributed enterprise system, especially one that operates abstractly above a hardware/software layers of any individual machine or computing device. Business process flows are often implemented in such an environment. For example, business flow processes implemented in compliance with WEBSPHERE PROCESS server v. 6 are enterprise level processes. These processes can operate within a service oriented architecture (SOA). Services components for these processes can be defined using a Service Component Architecture (SCA). Business object definitions can be used to define data for the processes. Monitoring of the business processes can be in accordance with a common even infrastructure. In this illustrative environment, tools such as Rational Developer for System z are used for developing enterprise information system applications. Other tools, such as Customer Information Control System (CISC) Service flow Modeler (SFM) can be used within this type of business flow environment.

The disclosure adds enterprise tooling functionality for compensation actions needed for process flows. These compensation actions can be triggered whenever execution problems occur. Different compensation scopes can be defined for the compensation actions using the graphical compensation tool detailed herein. That is, each compensation action can involve a set of one or more nodes within a business process flow application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a software development environment 100 having graphical user interface 110 that includes a compensation tool 112, which is a graphical tool for viewing, creating, and editing compensation functionality to business flows and/or applications comprising business flows. The graphical tool 112 can be associated with implementation code 176 that is stored in a tangible storage media and executable by a computing device (e.g., device 104 or server 108). The compensation tool 112 permits a user to graphically select a node 114 on a canvas 116 of a user interface 110. The canvas 116 can show a process flow application comprising a set of nodes 114, which can be manipulated.

Each node can be a reusable component of a business process application. A node can include one or more process flows. Nodes can use information hiding principles so that internal processes are hidden other than those intentionally exposed. For example, input and output parameters can be defined for a node, as well as node-specific behavior, which is all that application developers utilizing a node need be aware of. The hiding (non-exposure) of internal workings of a node is significant for enabling re-use. Defined standards (business flow application standards) can constrain implementation specifics of nodes, which for interoperability purposes will conform to standards defined for the runtime environment within which they shall be utilized.

A set (zero to N) of compensation actions can be established for any selected node 114. Making different selections within the canvas 116 can dynamically change content of a set of windows 120-130 so that the content presented within the windows 120-130 relates to a node (or set of nodes) selected within the canvas 116. The canvas 116 can be part of an integrated development environment (IDE), such as an ECLIPSE based IDE.

The compensation actions able to be handled by compensation tool 112 can include those shown in window 120. Actions can be triggered by a configurable condition, which a user can select using interface item 121. These actions can include, but are not limited to: action 122 for retrying an action N number of times; action 124 for invoking another node/flow; action 126 for invoking user-provided compensation code; and an interface item 128 for taking no action.

Additionally, a flow developer 102 using the compensation tool 112 can select a set of one or more nodes (element 134), which are able to be grouped (group 132) into a single compensation scope, definable within window 130. Each defined scope can have a unique group name 132 and identifier. Nodes 134 can be dynamically added (136) and removed (137) from the group 132. Each compensation action (120) can have a compensation scope 130. For example, compensation can be for a local node only (by default), which can be changed via the compensation tool 112 to include prior nodes and/or to a set of user-selected nodes. In one embodiment, a node having a local compensation scope need not have an explicit grouping 132 associated with it, since the local, single node scope can be a default. For each compensation action, a developer 102 can specify which compensation scope (130) is to apply.

In one embodiment, an option 140 to edit compensation action code can be provided. This includes code generated automatically as a result of graphically established preferences for compensation actions (input via element 122-128, for example) and compensation scope (input via window 130, for example). Selection of button 140 can result in presentation of a text editor, which may be tailored for code entry, debugging, etc. Similarly, compensation data (associated with selectable option 142) can be selectively presented in a raw form and edited at will by a developer 102.

Thus, the compensation tool 112 permits developers 102 to graphically defined compensation actions and scope, which can be converted (via software 176) into executable instructions, which have historically been input through exclusively manual means. The generated instructions (and/or manually entered/modified ones via button 140, 142 initiated editing) can be recorded in a compensation specification document 184. This document 184 can include any number of defined compensations 186. In one embodiment, the compensation document 184 can be discrete from a corresponding flow document 182. In another embodiment, compensations 186 and flow logic can be integrated into a single file 180 (or a set of N related files) and need not be contained in a distinct compensation document 184.

The development environment 100 can be implemented in a variety of different ways or configurations. A typical configuration establishes one or more servers 108 that are connected to client computers 104 via a network 106. Developers 102 interact with the client computer 104, which presents the user interface 110 including a graphical canvas 116 for visual development of enterprise information system (EIS) applications (IMS, CICS, etc.) applications. In one embodiment, client computer 104 can run a Web browser within which user interface 110 is presented. Further, stand-alone implementations are contemplated where a single computing device 104 hosts the software that includes the compensation tool 112.

Each of the computing devices 104, 108 of the development environment 100 can include hardware 162 and computer program product 170 components, as shown by device 160. Processing components 164 of the hardware 162 can include one or more microprocessors, memory, a bus, network cards, and the like. Input devices 165 can include a keyboard, mouse, touch screen, joystick, microphones, touch screens, and the like. The output devices 166 can include visual displays, audio speakers, and/or other sensory output devices. Data store 167 can be a tangible storage media. A data store 167 accessible by at least one of the devices 104, 108 in environment 100 can include process flow applications 168, for which the compensation tool 112 is used. Data store 167 can also store files 180, 182, 184 used for process flows and compensations 186. Each device 104, 108 can represent a single physical machine or a virtual machine implemented via N number of physical machines (each having hardware 162 components).

The computer program products 170 can include software and firmware. Products 170 can be tangibly stored in a physical memory and can include a set of instructions executable by the processing components 164. At least one of the devices 104, 108 of environment 110 can include a software development application 172, which includes user interface code 174 and compensation tool code 176. User interface code 174 can include executable instructions for rendering interface 110. Compensation tool code 176 can include executable instructions for performing functionality attributed to compensation tool 112 and for rendering interactive components of tool 112 within user interface 110.

Figure 2:
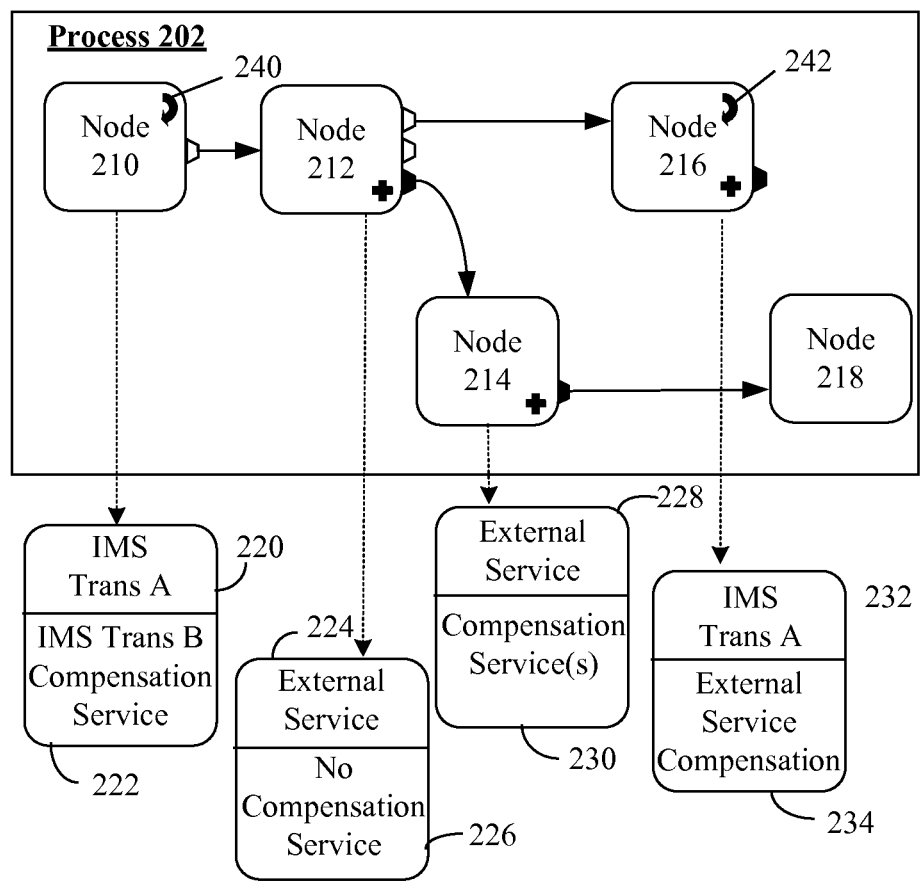
FIG. 2 shows a sample process includes a set of nodes having compensations, which can be established and viewed using a graphical compensation tool in accordance with an embodiment of the disclosure.

FIG. 2 shows a sample process 202 includes a set of nodes 210-218 having compensations, which can be established and viewed using a graphical compensation tool (e.g., tool 112) in accordance with an embodiment of the disclosure. This sample is provided to illustrate functionality of the graphical compensation tool (e.g., tool 112 implemented using code 176) through an easy to understand situation. Specifics of the sample process 202 are not to be construed as limiting the scope of the disclosure, but are instead provided to illustrate via example a set of concepts presented herein.

More specifically, diagram 200 of FIG. 2 shows a sample process 202 composed of five nodes 210-218. Output from Node 210 can be passed as input to Node 212, which invokes Node 214 or 216 in parallel order. Node 216 can invoke node 218.

In this example, Node 210 can invoke an information management system (IMS) Transaction_A 220 with IMS Transaction_B 222 as a compensation service. Node 212 invokes an external service 224 with no defined compensation service 226. Node 214 can invoke external service 228 with a set of compensation services 230. Node 216 can invoke IMS Transaction_C 232 with external service compensation 234.

Thus, from the example of diagram 202 it is evident each node can have zero or more compensation services; that a primary service (220, 224, 228, 232) of each node 210-218 can be an internal (local to the IMS, for example) or external service; and, that compensation actions (222, 226, 230, 234) for each node can be non-existent, can include one or more internal (local) service, and/or can include one or more external service. When nodes 210-218 are presented within a visual interface (canvas 116, for example) characteristic graphics, icons, or other visual indicators (e.g., elements 240, 242, 244) can be displayed that visually convey to a developer whether compensation actions have been established per node and convey a bit about the nature of these compensation actions. In one embodiment, a selection (pointing and clicking on one, for example) of these elements 240, 242, 244 within a visual interface will bring up an additional window, and/or information pane that provides additional information about the compensation functionality of the nodes, which may optionally be edited.

For those nodes (Node 210 and 216) with a retry compensation action 240, 242 against them, the retrying action 240, 242 may only take place after an error (defined expansively as an event triggering a compensation action) occurs. The error can correspond to a timeout return code and reason code. If one of the established retries is successful (on a node having a retry action associated with it), there is no need to attempt any further defined compensation (222, 226, 230, 234). Appreciably, the service compensations 222, 226, 230, 234 and retry actions 242, 242 can be established, viewed, and/or edited using a graphical compensation tool (interface 110 and action window 120 of FIG. 1, for example).

If all retry attempts result in timeouts, then the flow of the process 202 may end, when no further compensation actions are defined. For example, if node 212 were to have associated retry actions (not shown in FIG. 2A or 2B), and these retry attempts resulted in timeouts, the process 202 would end since no compensation service 226 is defined for node 212. If an additional compensation action (other than a retry compensation action) is defined for a node, then that compensation action will only be attempted after a node failure and after the retry account is exhausted. For example, the IMS Transaction_B 222 will only be attempted after node 210 fails when attempting to execute IMS Transaction_A 220 and N number of retry attempts (defined by action 240 using GUI element 122, for example) also fail.

It should be noted that after a compensation 222, 226, 230, 234 completes, control returns to the flow 220, 224, 228, 232 that invoked the compensation. More specifically, control returns to an execution state and logic positioning where the compensation 222, 226, 230, 234 was invoked.

Figure 3A:
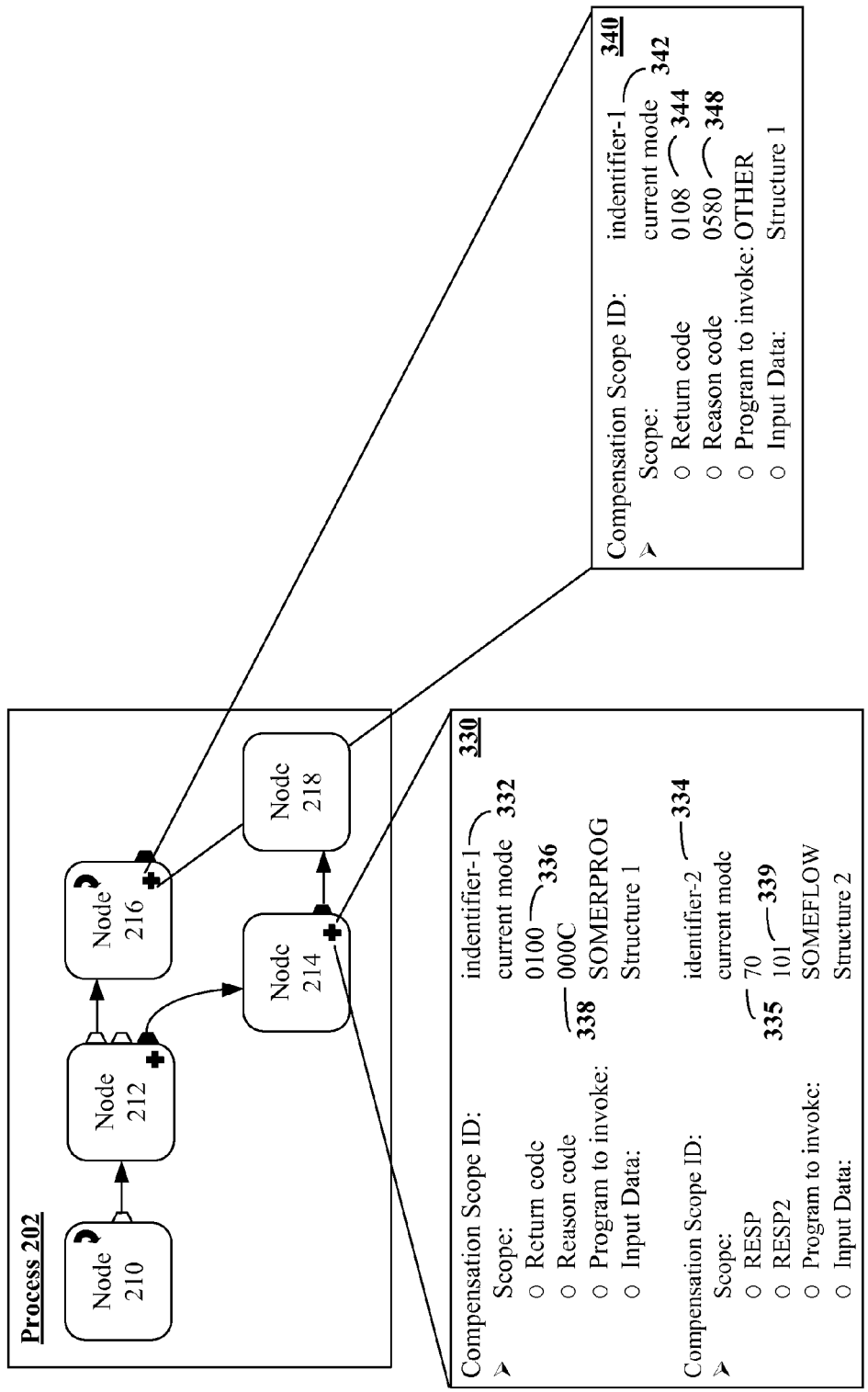

Diagram 300 of FIGS. 3A, 3B, and 3C show a sample error case using IMS synchronous callout error (table 350) and CICS LINK error conditions (table 360) that can be evaluated to determine whether compensation actions should be executed. Table 350 shows return codes for the ICAL call. Table 360 shows CICS program LINK conditions. Table 330 shows compensation logic and data established for node 214. Table 340 shows compensation logic and data established for node 216.

As shown by table 330, two different compensations 332, 334 are defined, each having a unique defined scope (which is a single node as shown in table 330). Compensation 332 is an IMS compensation that is invoked based on the error return code 336, specifically code 0100. In table 350, this code 352 is associated with a set of different reason codes 354. Compensation 332 activates for Return Code 0100 (shown as item 336) and reason code 000C (shown as item 338), which from table 350 has a description of "partial output response is returned." Compensation 332 invokes SOMERPROG which uses Structure) for input.

Compensation 334 is a CICS compensation that activates for CICS RESP 70 (shown as item 335) and RESP2 101 (shown as item 339), which from table 360 is a NOTAUTH error having a description of "a resource security check has failed on PROGRAM (name)." Compensation 334 invokes SOMEFLOW which uses Structure2 for input.

Compensation 342 is an IMS compensation that activates for Return Code 0108 (shown as item 344) and reason code 0058 (shown as item 348), which from table 350 has a description of "Unable to send the request message to the external application." Compensation 342 invokes OTHER which uses Structure) for input.

Although the examples shown by tables 330, 340 use information from table 350 and 360, it is easy to change the underlying parameters to utilize specifics for a any system's codes. Thus, a developer need not know (or directly input) specific return codes and/or code level elements of a compensation specific document 184. Instead, a developer can graphically work with flows and compensations within a canvas, where low-level code elements are automatically generated.

In other words and in one embodiment, the specifics shown in tables 330, 340, 350, 360 or portions thereof can be presented to a developer 102 upon selected edit code element 140 and/or edit data element 142. Return codes and reason codes relevant to a compensation can be automatically translated to descriptions, which are presented within the GUI 110 for developer selection as needed. Specifics shown in table 330, 340 can be automatically established using compensation tool code 176 based on graphic based user settings input using the compensation tool 112 (specifically windows 120 and/or 130).

It should be noted that the specific graphical elements and arrangements of the disclosures' interfaces (including those shown in the FIGs) are provided to express inventive concepts disclosure herein. These illustrative interfaces are not to be construed narrowly to constrain the scope of the disclosure. That is, deviations and alternative expressions for the presented concepts are expected and are to be considered within scope of the disclosure, legal protection for which being defined by the claims presented herein.

The graphical compensation tool can be implemented within any of a variety of business process flow developer tools. Thus, specific configuration details are expected to vary to match underlying requirements of a specific tool/environment within which the compensation tool is integrated. Further, a look-and-feel of visual interface elements is expected to match a look-and-feel of a development tool within which it is incorporated in order to present a unified end-user experience. Sample products (IBM specific ones are shown, but other vender's equivalent products could likewise be utilized) suitable for the compensation tool defined herein include, but are not limited to, IBMs CICS's Service Flow Modeler, IBM's Callout Server, Rational Developer Visual Flow Composition Editor and Flow Composition Generator, and IBM's IMS Process Tooling Server (as defined by SVL8-2008-0358, which is included herein by reference as one contemplated embodiment for the disclosure).

The flowchart and block diagrams in the disclosure's Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for graphical handling compensation in process flow applications comprising:
   displaying a plurality of node objects, each for a specific node within a canvas of a graphical user interface, wherein each node is a reusable component of a process flow application, wherein each node is a functional component with internal functionality not externally exposed except through defined input and output parameters, wherein said nodes interact with one another in a manner expressed within the graphical user interface by linkages between the corresponding node objects;
   presenting an interactive graphical compensation tool operable to define compensation actions for said nodes, wherein said compensation actions comprise actions to be taken responsive to an error condition to preserve a transaction processing state of the corresponding node;
   receiving a set of at least one user selections of graphical interface elements of the interactive graphical compensation tool, where said user selections define compensation functionality to be established for a node, which is graphically selected by selecting a corresponding node object in the canvas; and
   creating compensation logic for the node in accordance with the user selections, wherein the creating of the compensation logic requires no manual code-level input from a user.

2. The method of claim 1, wherein each node comprises at least one flow of an enterprise information system (EIS) process flow application.

3. The method of claim 1, wherein said canvas is a canvas an integrated development environment (IDE) canvas of a software development tool operable to visually compose process flows for process flow applications.

4. The method of claim 1, wherein said interactive graphical component tool is a user interface component of an ECLIPSE compliant software development tool operable to visually compose process flows for process flow applications.

5. The method of claim 1, wherein said graphical compensation tool comprises a user interface element for a retry compensation action, where a user is able to specify a user selectable integer for a number of retry attempts that are to be performed for the corresponding node when a processing error occurs when executing the node, wherein the creating of compensation logic adds logic to the corresponding node to perform a number of retry attempts equal to the user specified integer when processing errors occur when executing the node.

6. The method of claim 1, wherein the graphical compensation tool comprises a user interface element for specifying a different node to invoke responsive to the error condition, wherein the creating of compensation logic causes the selected different node to be invoked when processor errors occur when executing the node, wherein process execution returns to a point at which the different node was invoked once the different node has executed.

7. The method of claim 1, wherein the graphical compensation tool comprises a user interface element for specifying an error condition, wherein the creating of the compensation logic causes the specified error condition to trigger the compensation action specified in the graphical user interface.

8. The method of claim 1, further comprising:
   visually showing within each node object of the canvas an indicator of whether or not a retry compensation action has been established for the corresponding node.

9. The method of claim 1, further comprising:
   visually showing within each node object of the canvas an indicator of whether compensation code exists that is to be invoked as a compensation whenever a corresponding node encounters an error.

10. The method of claim 1, wherein each node is a flow of the process flow application, wherein the graphical compensation tool permits a user to specify a flow that is to execute for a selected node as a compensation action, said method further comprising:
    visually showing within each node object of the canvas, and indicator of whether the corresponding node has an flow established as a compensation action for the node.

11. The method of claim 1, said graphical compensation tool comprising a graphical element for specifying a compensation scope for each specified compensation action, wherein user input for the compensation scope graphical element determines which nodes if any as specified by the user other than the corresponding node are involved in a compensation action, which is also specified using the graphical compensation tool.

12. The method of claim 1, further comprising:
    for each node, establishing a compensation specification document that is a separate document from a flow document of the node, wherein the created compensation logic is defined within the compensation specification document.

13. The method of claim 1, further comprising:
    defining specific return codes and reason codes within the compensation logic, wherein occurrences of the return codes and reason codes trigger compensation actions defined within the compensation logic, wherein none of the return codes or reason codes are textually input by a user and are instead determined by machine logic as part of the creating of the compensation logic in accordance with the user selections.

14. A non-transitory computer readable storage medium having computer usable program code embodied therewith, the computer usable program code that is stored in the non-transitory computer readable storage medium comprising:
    computer usable program code operable to display a plurality of node objects, each for a specific node within a canvas of a graphical user interface, wherein each node is a reusable component of a process flow application, wherein each node is a functional component with internal functionality not externally exposed except through defined input and output parameters, wherein said nodes interact with one another in a manner expressed within the graphical user interface by linkages between the corresponding node objects;
    computer usable program code operable to present an interactive graphical compensation tool operable to define compensation actions for said nodes, wherein said compensation actions comprise actions to be taken responsive to an error condition to preserve a transaction processing state of the corresponding node;

computer usable program code operable to receive a set of at least one user selections of graphical interface elements of the graphical compensation tool, where said user selections define compensation functionality to be established for a node, which is graphically selected by selecting a corresponding node object in the canvas; and computer usable program code operable to create compensation logic for the node in accordance with the user selections, wherein the creating of the compensation logic requires no manual code-level input from a user.

15. The non-transitory computer readable storage medium of claim 14, wherein said canvas is a canvas an integrated development environment (IDE) canvas of a software development tool operable to visually compose process flows for process flow applications.

16. A computing device comprising:
one or more processors;
at least one non-transitory storage medium storing program instructions, said program instructions executing on the one or more processors to:
  display a plurality of node objects, each for a specific node within a canvas of a graphical user interface, wherein each node is a reusable component of a process flow application, wherein each node is a functional component with internal functionality not externally exposed except through defined input and output parameters, wherein said nodes interact with one another in a manner expressed within the graphical user interface by linkages between the corresponding node objects;
  present an interactive graphical compensation tool operable to define compensation actions for said nodes, wherein said compensation actions comprise actions to be taken responsive to an error condition to preserve a transaction processing state of the corresponding node;
  receive a set of at least one user selections of graphical interface elements of the interactive graphical compensation tool, where said user selections define compensation functionality to be established for a node, which is graphically selected by selecting a corresponding node object in the canvas; and
  create compensation logic for the node in accordance with the user selections, wherein the creating of the compensation logic requires no manual code-level input from a user.

17. The computing device of claim 16, wherein each node comprises at least one flow of an enterprise information system (EIS) process flow application.

18. The computing device of claim 16, wherein said canvas is a canvas an integrated development environment (IDE) canvas of a software development tool operable to visually compose process flows for process flow applications.

19. The computing device of claim 16, wherein said interactive graphical component tool is a user interface component of an ECLIPSE compliant software development tool operable to visually compose process flows for process flow applications.

20. The computing device of claim 16, wherein said graphical compensation tool comprises a user interface element for a retry compensation action, where a user is able to specify a user selectable integer for a number of retry attempts that are to be performed for the corresponding node when a processing error occurs when executing the node, wherein the creating of compensation logic adds logic to the corresponding node to perform a number of retry attempts equal to the user specified integer when processing errors occur when executing the node.

* * * * *